(12) United States Patent
Kitahara et al.

(10) Patent No.: US 11,931,979 B2
(45) Date of Patent: Mar. 19, 2024

(54) TIRE VULCANIZATION MOLD AND MANUFACTURING METHOD FOR TIRE

(71) Applicant: The Yokohama Rubber Co., LTD., Tokyo (JP)

(72) Inventors: Tsubasa Kitahara, Kanagawa (JP); Yoshiaki Matsumoto, Kanagawa (JP); Mika Nagashima, Kanagawa (JP); Mitsuo Tsuji, Kanagawa (JP); Yoshinori Izumi, Kanagawa (JP); Rinko Kushida, Kanagawa (JP); Koichiro Miyoshi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/597,227

(22) PCT Filed: Jul. 1, 2020

(86) PCT No.: PCT/JP2020/025769
§ 371 (c)(1),
(2) Date: Dec. 29, 2021

(87) PCT Pub. No.: WO2021/002378
PCT Pub. Date: Jan. 7, 2021

(65) Prior Publication Data
US 2022/0305750 A1  Sep. 29, 2022

(30) Foreign Application Priority Data
Jul. 3, 2019  (JP) .................................. 2019-124661

(51) Int. Cl.
B29D 30/06  (2006.01)
(52) U.S. Cl.
CPC ..... B29D 30/0606 (2013.01); B29D 30/0633 (2013.01); *B29D 2030/0612* (2013.01);
(Continued)

(58) Field of Classification Search
CPC ............ B29D 30/0606; B29D 30/0633; B29D 2030/0612; B29D 2030/0616; B29D 2030/0638
(Continued)

(56) References Cited

U.S. PATENT DOCUMENTS 5,637,245 A * 6/1997 Shelton ................. B08B 7/0042
219/121.84
2010/0282387 A1* 11/2010 Wenzel ..................... C23C 4/00
152/209.15
(Continued)

FOREIGN PATENT DOCUMENTS

CN  206326775 U   7/2017
EP     792731 A2 *  9/1997  ........... B08B 7/0042
(Continued)

OTHER PUBLICATIONS

GooglePatents computer-translation to English of CN206326775U "Tang ZhengQuan, Tire-Mold Noble Gas Laser Cleaning Machine, Dec. 1, 2016, pp. 1-7" (Year: 2016).*
(Continued)

*Primary Examiner* — S. Behrooz Ghorishi
*Assistant Examiner* — Gregory C. Grosso
(74) *Attorney, Agent, or Firm* — Thorpe North & Western

(57) ABSTRACT

A tire vulcanization mold in which a surface roughness in the groove molding portion of the tread molding surface is made smaller than a surface roughness in the land portion molding portion, in which a surface roughness in the groove molding portion is minimized to 0.12 μm or less in a range including at least a main groove molding portion, and in which a surface roughness in the land portion molding portion is made to be 3.2 μm or more, is used to manufacture a tire, and when cleaning the tread molding surface, the tread
(Continued)

molding surface is irradiated with a laser beam to remove contaminant adhered to the tread molding surface.

13 Claims, 12 Drawing Sheets

(52) U.S. Cl.
CPC ............... *B29D 2030/0616* (2013.01); *B29D 2030/0638* (2013.01)

(58) Field of Classification Search
USPC .......................................................... 264/39
See application file for complete search history.

(56) References Cited

U.S. PATENT DOCUMENTS

| | | | | |
|---|---|---|---|---|
| 2013/0068363 A1* | 3/2013 | Ikemura | ................... | B24C 1/06 |
| | | | | 152/450 |
| 2014/0367010 A1 | 12/2014 | Kawakita | | |
| 2016/0185162 A1* | 6/2016 | Kaji | ....................... | B29D 30/68 |
| | | | | 425/28.1 |
| 2017/0348877 A1 | 12/2017 | Wenzel et al. | | |
| 2018/0045611 A1* | 2/2018 | Kraus | ................ | B29D 30/0016 |
| 2018/0354313 A1* | 12/2018 | Blanchet | ............. | B60C 11/1281 |
| 2021/0039345 A1* | 2/2021 | Tsuji | .................. | B23K 26/1464 |

FOREIGN PATENT DOCUMENTS

| | | |
|---|---|---|
| JP | 02-074404 A | 3/1990 |
| JP | 2000-037728 A | 2/2000 |
| JP | 2000-142026 A | 5/2000 |
| JP | 2006-001491 A | 1/2006 |
| JP | 2013-136279 A | 7/2013 |
| JP | 2016-34707 A | 3/2016 |
| JP | 2016-120857 A | 7/2016 |
| RU | 2578520 C2 | 3/2016 |

OTHER PUBLICATIONS

GooglePatents computer-translation to English of CN206326775U (Tang Zhengquan, "Tire-Mold Noble Gas Cleaning Machine", Dec. 1, 2016, pp. 1-7.) (Year: 2016).*
GooglePatents computer-translation to English of CN206326775U (Tang Zhengquan, :Tire Mold Noble Gas Cleaning Machine, Dec. 1, 2016, pp. 1-7.) (Previously entered into application file.) (Year: 2016).*

* cited by examiner

# TIRE VULCANIZATION MOLD AND MANUFACTURING METHOD FOR TIRE

TECHNICAL FIELD

The present technology relates to a tire vulcanization mold and a method of manufacturing a tire, and particularly relates to a tire vulcanization mold and a method of manufacturing a tire using the tire vulcanization mold that can ensure good tire performance while avoiding a problem of rubber chip formation in the tire over a long period of time.

BACKGROUND ART

Contaminants derived from rubber components or compounding agents adhere slightly to a molding surface of a tire vulcanization mold every time the vulcanization is performed. Since the contaminants gradually accumulates as the mold is repeatedly used, leaving the contaminants as is negatively impacts the quality of the vulcanized tire. Thus, as appropriate, the contaminants need to be removed by cleaning the molding surface. Examples of known mold cleaning methods include a shot blasting cleaning method, a plasma cleaning method, and a laser beam cleaning method.

In the shot blasting cleaning method, the molding surface is easily damaged, and thus in order to prevent damage to the molding surface due to cleaning, a plasma cleaning method in which the contaminants are chemically reacted and removed by generated plasma, or a laser beam cleaning method in which the molding surface is irradiated with a laser beam to remove the contaminants by a shock wave, is preferred. However, an area that the plasma cleaning method can clean in a unit time is small and maintenance work of the plasma cleaning method is time-consuming. Therefore, the laser beam cleaning method is more desirable considering efficiency.

However, performing vulcanization using a mold cleaned by a laser beam has a problem of rubber chip formation in the manufactured tire where, when the vulcanized rubber is released from the mold, the vulcanized rubber remains adhered to the tread molding surface of the mold (see Japan Unexamined Patent Publication No. 2016-34707). To address the problem, in Japan Unexamined Patent Publication No. 2016-34707, irradiating the molding surface with a laser beam to reach a desired ridge/groove state is proposed. However, confirming whether the molding surface is in the desired ridge/groove state proposed in Japan Unexamined Patent Publication No. 2016-34707 (average interval between two adjacent ridges is 4.7 μm or less) is difficult.

SUMMARY

The present technology provides a tire vulcanization mold and a method of manufacturing a tire using the tire vulcanization mold that can ensure good tire performance while avoiding the problem of rubber chip formation in the tire over a long period of time.

A tire vulcanization mold of an embodiment of the present technology includes a tread molding surface including a groove molding portion and a land portion molding portion, a surface roughness Ra in the groove molding portion being smaller than a surface roughness Ra in the land portion molding portion, in the groove molding portion, a surface roughness Ra being the smallest at 0.12 μm or less in a range including at least a main groove molding portion, and a surface roughness Ra in the land portion molding portion being 3.2 μm or more.

A method of manufacturing a tire of an embodiment of the present technology vulcanizes a green tire using the tire vulcanization mold described above.

According to embodiments of the present technology, a surface roughness Ra in the groove molding portion is smaller than a surface roughness Ra in the land portion molding portion, and in the groove molding portion, a surface roughness Ra is minimized to 0.12 μm or less in a range including at least a main groove molding portion, thereby facilitating release between the main groove molding portion and the vulcanized rubber that tend to adhere firmly when the green tire is vulcanized. As a result, the problem of rubber chip formation in the tire due to the vulcanized rubber remaining adhered to the tread molding surface can be avoided. Furthermore, by reducing the surface roughness Ra in the main groove molding portion in this manner, the generation of ultrafine protrusions in the irradiation range is suppressed even when the tread molding surface is irradiated with a laser beam for cleaning. Thus, not only when the mold is new, but also after repeated use and cleaning, release between the main groove molding portion and the vulcanized rubber is facilitated, and thereby the problem of rubber chip formation in the tire can be avoided.

Additionally, the land portion molding portion has a surface roughness Ra of 3.2 μm or more, and thus the tread land portion of the manufactured tire to be excessively smooth can be avoided. As a result, the running performance on ice of the tire and the like are not reduced, and good tire performance can be ensured.

DETAILED DESCRIPTION

A vulcanization mold and method of manufacturing a tire according to embodiments of the present technology will be described with reference to the drawings.

Figure 1:
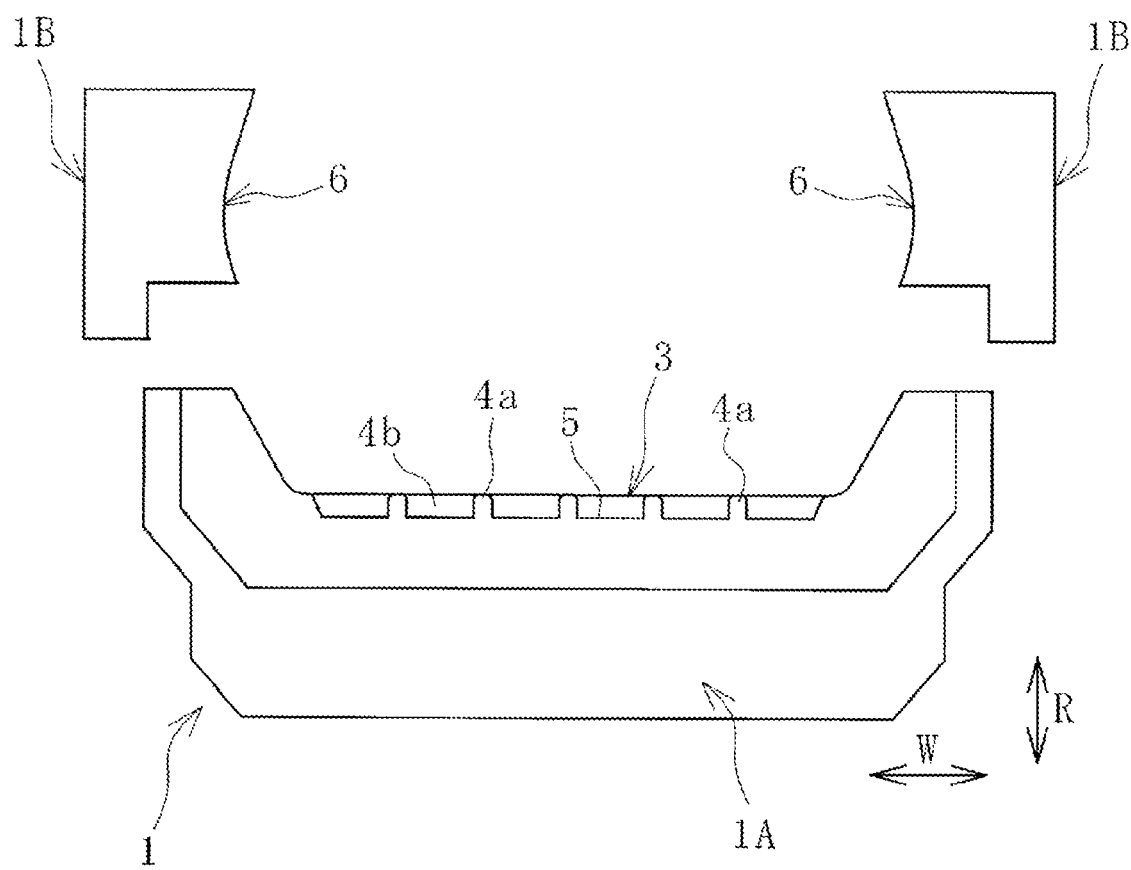
FIG. 1 is an explanatory diagram illustrating a part of a tire vulcanization mold in a cross-sectional view.
Figure 2:
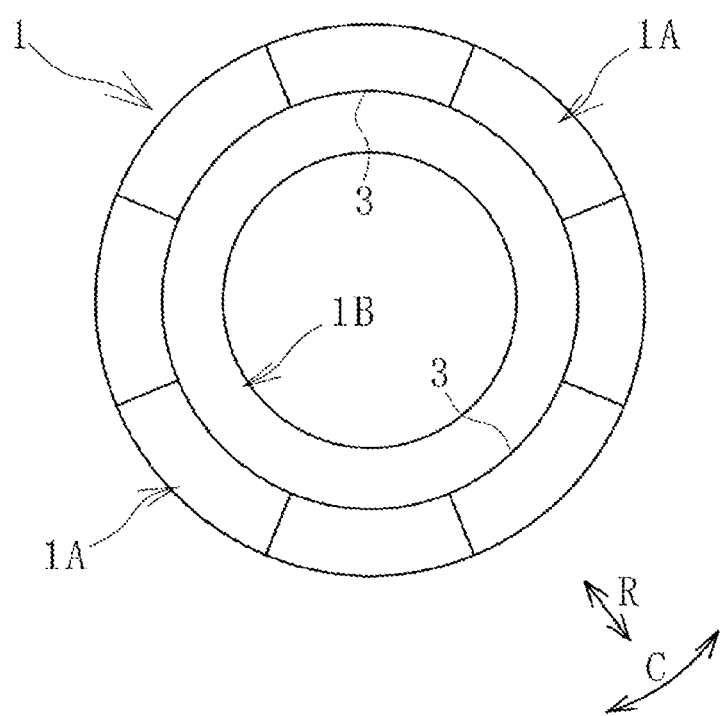
FIG. 2 is an explanatory diagram illustrating a tire vulcanization mold in a plan view.
Figure 3:
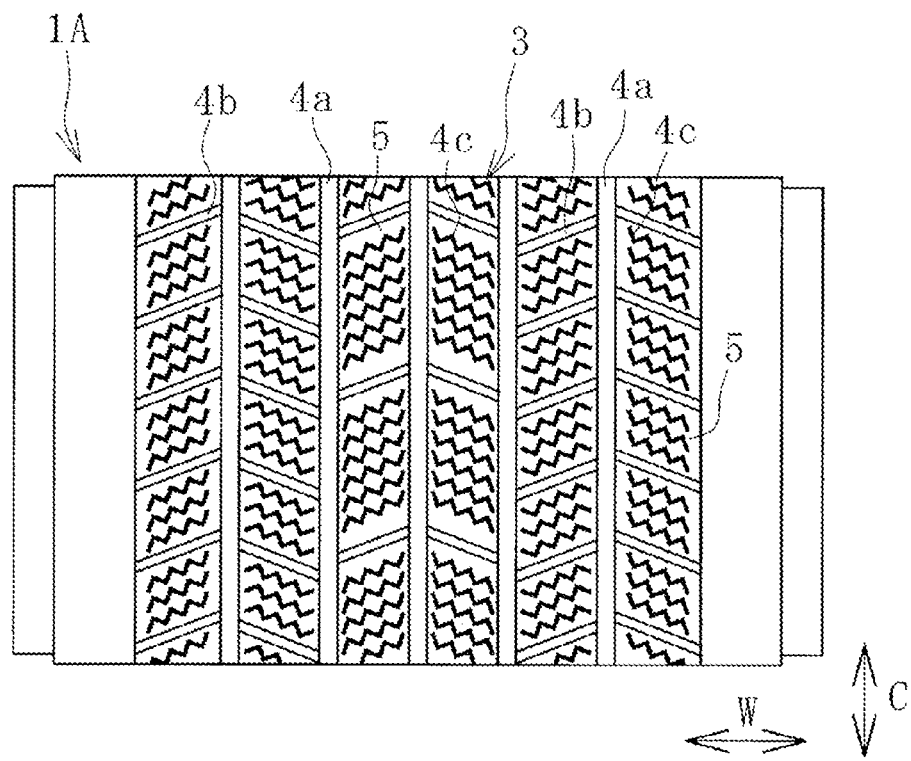
FIG. 3 is an explanatory diagram illustrating a tread molding surface of FIG. 1 in a plan view.

A tire vulcanization mold 1 (hereinafter, referred to as mold 1) according to an embodiment of the present technology illustrated in FIGS. 1 to 3 includes a sector mold 1A having a tread molding surface 3 and a side mold 1B having a side molding surface 6. A plurality of arcuate sector molds 1A are assembled to form a cylindrical shape. The two annular side molds 1B are assembled onto both ends of the cylindrically assembled sector molds 1A. A C arrow, an R arrow, and a W arrow described in the figures respectively indicate a circumferential direction, a radial direction, and a width direction of a green tire that is to be disposed within the mold 1 and vulcanized therein.

The tread molding surface 3 includes a convex groove molding portion 4 and a land portion molding portion 5. The groove molding portion 4 includes a main groove molding portion 4a and a subsidiary groove molding portion 4b. In this embodiment, the groove molding portion 4 further includes a sipe molding portion 4c. The sipe molding portion 4c is not necessarily required.

The main groove molding portion 4a, the subsidiary groove molding portion 4b, and the land portion molding portion 5 are casted integrally with a base material of the mold 1 and the sipe molding portion 4c is attached to the tread molding surface 3 separately from the base material of the mold 1. The base material of the mold 1 is usually made of aluminum and the sipe molding portion 4c is made of steel or the like. The thickness of the sipe molding portion 4c is about 0.4 mm or more and 1.2 mm or less.

Figure 4:
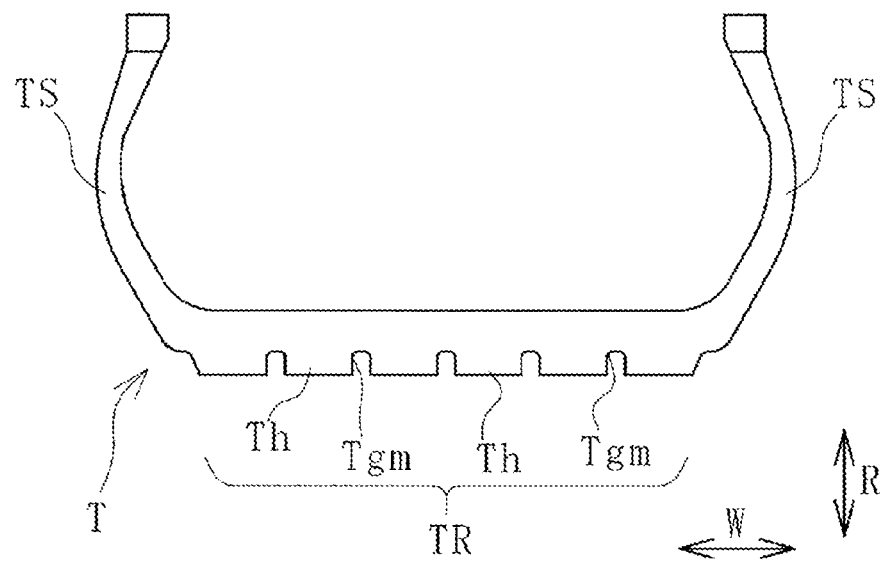
FIG. 4 is an explanatory diagram illustrating a part of a manufactured tire in a cross-sectional view.
Figure 5:
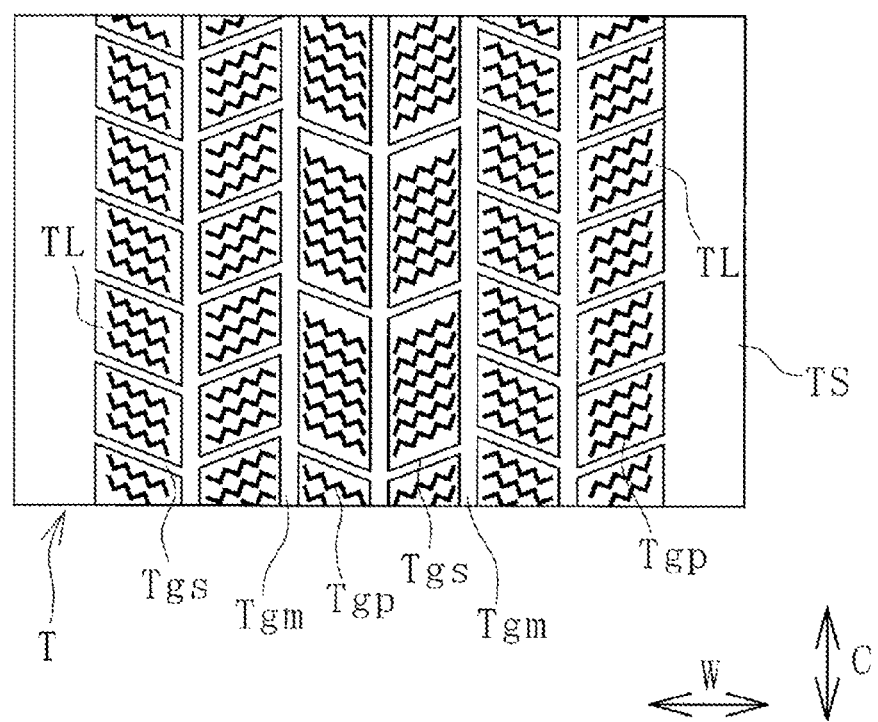
FIG. 5 is an explanatory diagram illustrating a tire (tread) of FIG. 4 in a front view.

The outer surface of the green tire TG is pressed against the molding surface 2 (the tread molding surface 3 and the side molding surface 6) of the mold 1. As a result, as illustrated in FIGS. 4 and 5, the green tire TG becomes a tire T molded into a predetermined shape so that the shape of the molding surface 2 is transferred.

Specifically, the tread TR and the side TS of the tire T are vulcanization molded by the tread molding surface 3 and the side molding surface 6, respectively. Note that the tread TR also includes a tire shoulder in this figure. In the tread molding surface 3, a main groove Tgm, a subsidiary groove Tgs, and a sipe Tgp of the tire T are vulcanization molded by the main groove molding portion 4a, the subsidiary groove molding portion 4b, and the sipe molding portion 4c, respectively, and a land portion Th of the tire T is vulcanization molded by the land portion molding portion 5.

"Main groove Tgm" refers to a groove on which a wear indicator must be provided as specified by JATMA (The Japan Automobile Tyre Manufacturers Association, Inc.) and which is typically having a groove width of 5.0 mm or more and a groove depth of 6.5 mm or more. The main groove Tgm extends not only in the tire circumferential direction, but may also extend in the tire width direction or in a direction inclined with respect to the tire width direction. The subsidiary groove Tgs is a groove (excluding the sipe Tgp) having a groove width smaller than that of the main groove Tgm and/or having a groove depth smaller than that of the main groove Tgm.

According to an embodiment of the present technology, a surface roughness Ra in the molding surface 2 is specially devised. The surface roughness Ra is the arithmetic mean roughness as specified in JIS (Japanese Industrial Standard) B 0601:2001.

A surface roughness Ra in the groove molding portion 4 is smaller than a surface roughness Ra in the land portion molding portion 5. Furthermore, in the groove molding portion 4, a surface roughness Ra is the smallest at 0.12 μm or less in the range including at least the main groove molding portion 4a. More preferably, a surface roughness Ra in this range is set to 0.10 μm or less.

In this embodiment, the subsidiary groove molding portion 4b and the sipe molding portion 4c also have a surface roughness Ra of 0.12 μm or less, and the groove molding portion 4 has a surface roughness Ra of is 0.12 μm or less in all ranges. The groove molding portion 4 can have a surface roughness Ra of 0.12 μm or less in all ranges except the sipe molding portion 4c. Alternatively, only the main groove molding portion 4a can have a surface roughness Ra of 0.12 μm or less.

The surface roughness Ra being 0.12 μm or less is in what is called a level of mirror finish, and is in a state of having a significantly high smoothness compared to a molding surface of a typical tire vulcanization mold. To finish to achieve such surface roughness Ra, for example, a known method of spraying a media core on which abrasive particles are carried around a core made from a special polymeric material onto the target portion to perform surface treatment.

The land portion molding portion 5 has a surface roughness Ra of 3.2 μm or more. The upper limit of the surface roughness Ra is 10 μm, for example. The side molding surface 6 preferably has a surface roughness Ra similar to that in the land portion molding portion 5.

As in this embodiment, embodiments of the present technology are not limited to a mold 1 of what is called sectional type, and can be similarly applied to a mold 1 of two-piece type.

Figure 6:
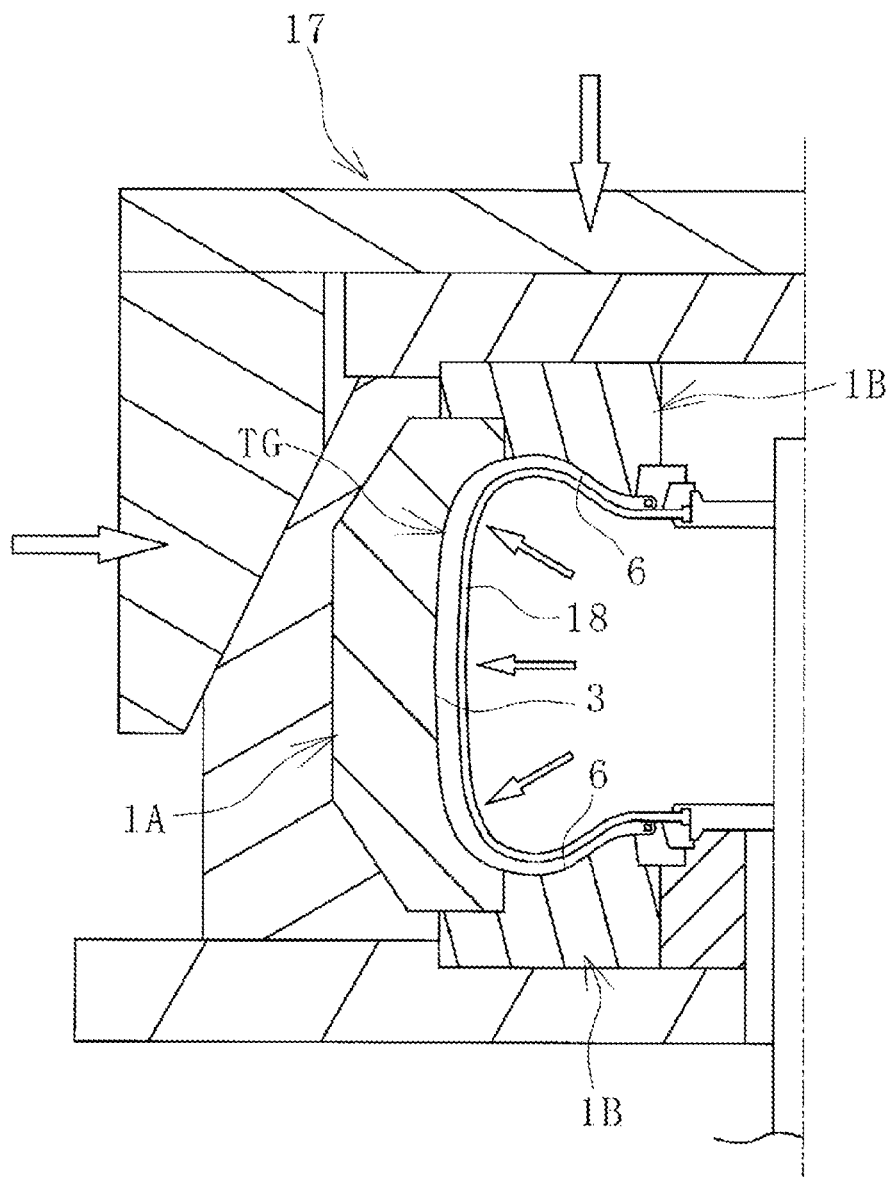
FIG. 6 is an explanatory diagram illustrating a left half of a vulcanization device vulcanizing a green tire with the mold being closed in a cross-sectional view.
Figure 7:
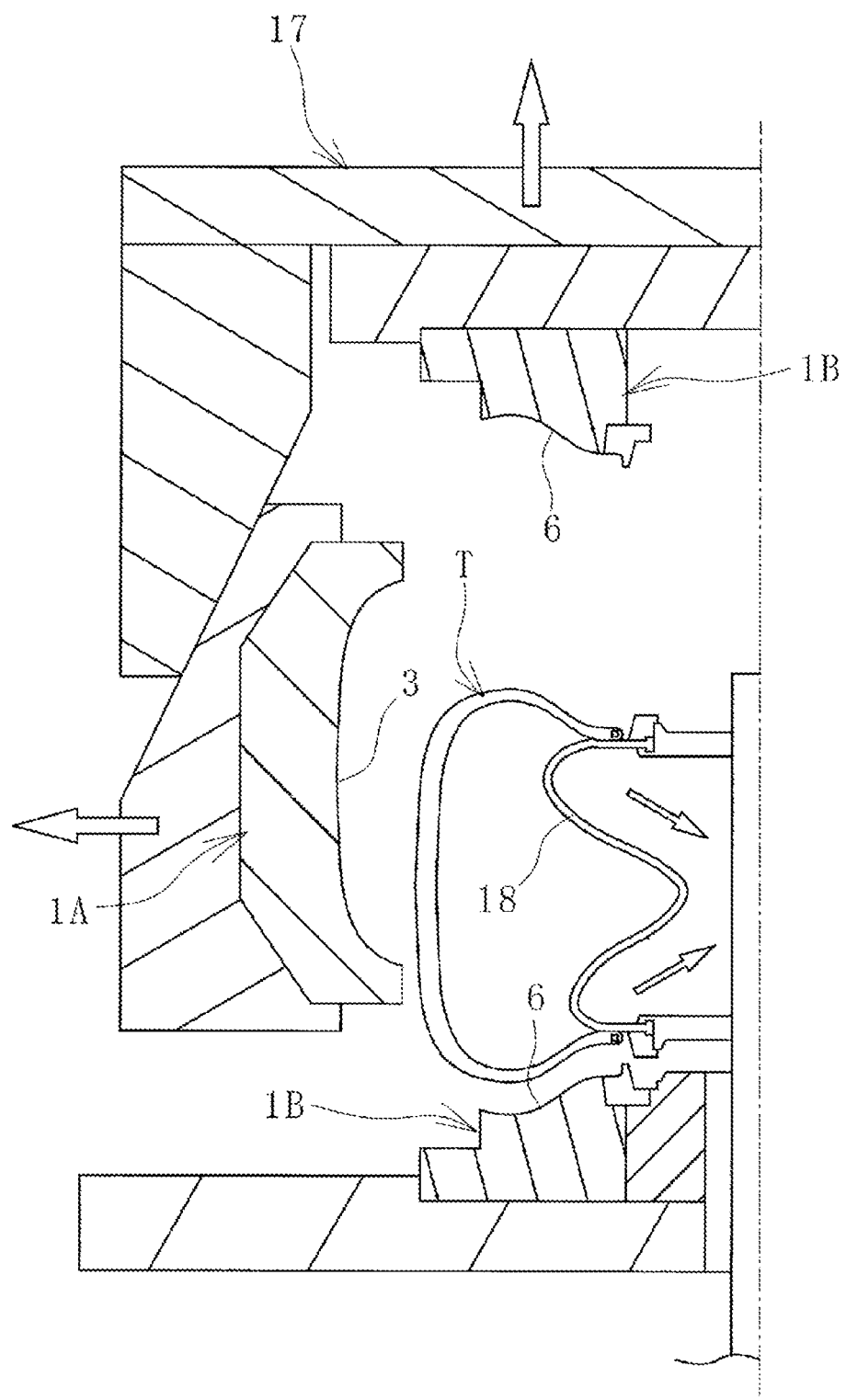
FIG. 7 is an explanatory diagram illustrating, in a cross-sectional view, a left half of the vulcanization device in a state in which the mold is opened and a vulcanized tire is released from the mold.

To manufacture a tire T using the mold 1, a green tire TG is disposed in the mold 1 (1A, 1B) installed in the vulcanization device 17 as illustrated in FIG. 6. Thereafter, the mold 1 is closed, a vulcanization bladder 18 is inflated inside the green tire TG, and the green tire TG is vulcanized. In this vulcanization step, an outer surface of the green tire TG is pressed against the molding surfaces 2 (3, 6) and molded so that the shape of the molding surface 2 is transferred. After a predetermined vulcanization time has elapsed, the mold 1 is opened as illustrated in FIG. 7, the vulcanization bladder 18 is contracted, and the vulcanized tire T is released from the mold 1.

A surface roughness Ra in the outer surface of the tire T is greater (rougher) than a surface roughness Ra in the corresponding molding surface 2, and is generally proportional to the degree of the surface roughness Ra in the molding surface 2. In other words, the smaller the surface roughness Ra in the molding surface 2, the smaller the surface roughness Ra in the portion of the tire T corresponding to the molding surface 2. Accordingly, in the tread TR, the surface roughness Ra in the main groove Tgm is the smallest. In this embodiment, the subsidiary groove Tgs and the sipe Tgp have a surface roughness Ra equal to that in the main groove Tgm. A surface roughness Ra in the land portion Th is greater than that in the main groove Tgm. In this embodiment, the side TS has a surface roughness Ra equal to that in the land portion Th.

According to an embodiment of the present technology, the main groove molding portion 4a, which tends to be adhered firmly to the vulcanized rubber has a surface roughness Ra of 0.12 μm or less. In other words, a surface area of the main groove molding portion 4a is minimized, and thus the release of the vulcanized rubber (tire T) and the mold 1 can be facilitated. As a result, the problem of rubber chip formation in the tire T due to vulcanized rubber remaining adhered to the tread molding surface 3 when releasing from the mold can be avoided.

In this embodiment, the groove molding portion 4 has a surface roughness Ra of 0.12 μm or less in all ranges, and thus release of the tire T is facilitated even more, making it increasingly advantageous in avoiding the problem of rubber chip formation in the tire T. To avoid the problem, the groove molding portion 4 preferably has a surface roughness Ra of 0.12 μm or less at a greater portion, or the surface roughness Ra is preferably made even smaller.

On the other hand, the land portion molding portion 5 has a surface roughness Ra of 3.2 μm or more, and thus the land portion Th of the tire T being excessively smooth can be avoided. As a result, the running performance on ice of the tire T and the like is not reduced, and good tire performance can be ensured. In this embodiment, the side TS also does not become excessively smooth. When the side TS is excessively smooth, unevenness of surface irregularities and the like will become noticeable, and the appearance quality can easily be affected. Accordingly, it is also advantageous for improving the appearance quality of the tire T.

Figure 8:
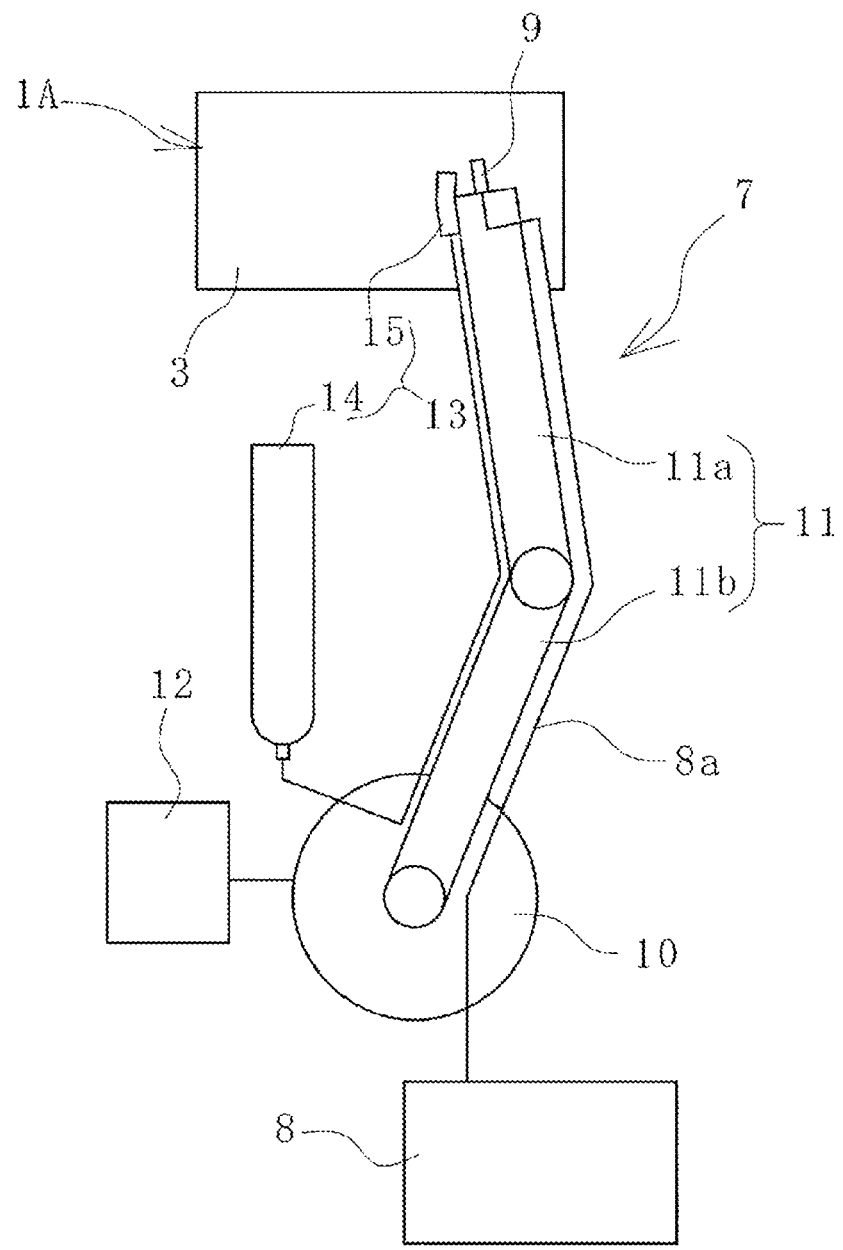
FIG. 8 is an explanatory diagram illustrating a cleaning device of the mold in a plan view.

The mold 1 is used to vulcanize a high number of green tires TG to manufacture the tires T. As a result, contaminant X adheres to the molding surface 2. Thus, the contaminant X is removed by irradiating the molding surface 2 (tread molding surface 3) with a laser beam L using a cleaning device 7 illustrated in FIG. 8. Then, the green tire TG is vulcanized using the mold 1 after the cleaning in which the contaminant X has been removed to manufacture the tire T.

The cleaning device 7 includes a laser oscillator 8, a laser head 9, and a gas supply unit 13 that supplies an inert gas G. The laser oscillator 8 and the laser head 9 are connected by an optical fiber cable 8a. The gas supply unit 13 includes a tank 14 containing the inert gas G, and a supply nozzle 15 connected to the tank 14 via a hose. Note that a mechanism for supplying the inert gas G (the gas supply unit 13, the tank 14, and the supply nozzle 15) can be provided discretionally.

The cleaning device 7 further includes an arm 11 to which the laser head 9 is attached, and a control unit 12 that controls movement of the arm 11 and the laser head 9. The arm 11 is rotatably attached to an arm base 10 and is configured by rotatably connecting a plurality of arm portions 11a, 11b. The laser head 9 is removably attached to an end portion of the arm 11.

The laser head 9 can be moved to a desired position in three dimensions by controlling movement of the arm 11. Because the supply nozzle 15 is also mounted on the end portion of the arm 11, a tip of the supply nozzle 15 can always be directed in the irradiation direction with the laser beam L.

The laser beam L supplied by the laser oscillator 8 is transmitted to the laser head 9 through the optical fiber cable 8a. The laser beam L from the laser head 9 irradiates the tread molding surface 3, which serves as a cleaning target portion in the mold 1.

The gas supply unit 13 supplies the inert gas G contained in the tank 14 from the supply nozzle 15 toward an irradiation range, or a periphery thereof, of the tread molding surface 3 irradiated with the laser beam L. As a result, the irradiation range is made to be under an atmosphere of the inert gas G.

For the laser beam L, a laser beam L that is conventionally used for cleaning the mold 1 can be used. Specific specifications of the laser beam L to be irradiated are as follows, for example. The type of the laser beam L is not particularly specified, but is preferably a Yb-YAG (Ytterbium-doped Yttrium Aluminum Garnet) laser beam (wavelength of 1030 nm) or an Nd-YAG (Neodymium-doped Yttrium Aluminum Garnet) laser beam (wavelength of 1064 nm). The light source output of the laser beam L is 1 W or more and 5 kW or less, the pulse width is 1 ns or more and 500 ns or less, the pulse energy is 1 mJ or more and 0.1 J or less, the pulse frequency is 1 kHz or more and 100 kHz or less, the fluence is 0.5 $J/m^2$ and 4.0 $J/m^2$ or less, a beam size (diameter) is 0.1 mm or more and 3 mm or less, the pulse overlap is 0% or more and 100% or less, and the line overlap is 0% or more and 100% or less.

In this embodiment, the laser head 9 is provided that irradiates a pinpoint with the laser beam L, but the laser head 9 is not limited to this type. For example, a laser head 9 of a type can be employed in which a galvano mirror is incorporated and the laser beam L can be scanned in a width direction to irradiate a wider range with the laser beam L. The number of the laser heads 9 is not limited to one, and a specification can be employed in which a plurality of the laser heads 9 are provided. It is also possible to have a specification having a plurality of laser heads 9 of the identical type or having different types of laser heads 9 in combination.

Surfaces and root portions of the sipe molding portion 4c and the thin groove molding portion 4 are portions where it is difficult to remove the contaminant X during the cleaning of the mold 1. The cleaning of the sector mold 1A is performed in a cleaning booth serving as a closed space. Note that, as with the sector mold 1A, the side mold 1B can be cleaned by being irradiated with the laser beam L, but may be cleaned by another known method.

Figure 9:
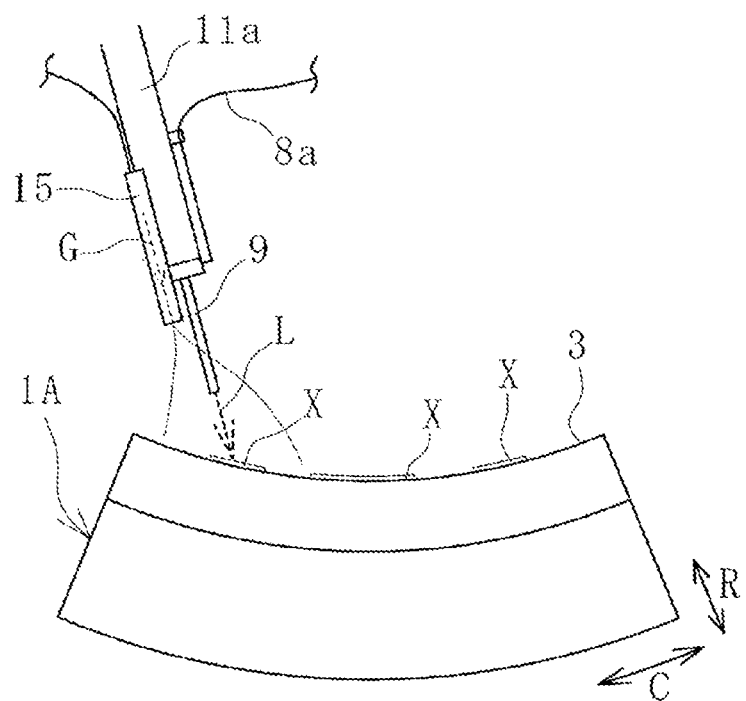
FIG. 9 is an explanatory diagram illustrating, in a side view, a state in which a sector mold is being cleaned.
Figure 10:
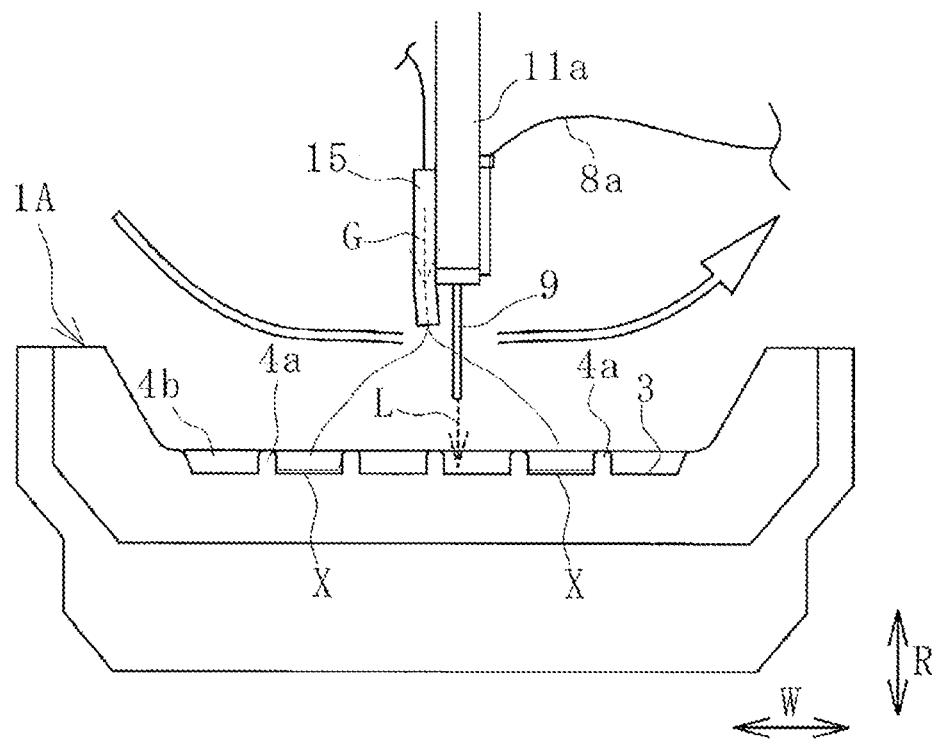
FIG. 10 is an explanatory diagram illustrating, in a front view, a state in which a sector mold is being cleaned.

When the sector molds 1A are washed one at a time, one sector mold 1A is placed in a predetermined position. The movement of the arm 11 is then controlled to move the laser head 9 along the tread molding surface 3 that is to be cleaned as illustrated in FIGS. 9 and 10. While the laser head 9 is being moved in this way, the tread molding surface 3 is irradiated with the laser beam L supplied from the laser oscillator 8.

The inert gas G is supplied from the supply nozzle 15 toward the irradiation range irradiated with the laser beam L as necessary, and the irradiation range is made to be under an atmosphere of the inert gas G. Nitrogen gas, argon gas, or the like can be used as the inert gas G. From the perspective of availability, cost, handling, and the like, nitrogen gas is preferably used as the inert gas G.

The contaminant X adhered to the tread molding surface 3 is removed and cleaned by irradiating with the laser beam L. The laser head 9 is moved to cover the range of the tread molding surface 3, that is to be the cleaning target portion, while irradiating and cleaning with the laser beam L under an atmosphere of the inert gas G.

The inventors of the present application confirmed that in cases where the surface roughness Ra in the tread molding surface 3 to be cleaned is at a level of 3.2 μm or more as in the related art, when the tread molding surface 3 is irradiated with the laser beam L in the atmosphere to remove the contaminant X, and the cleaned tread molding surface 3 is observed under magnification, ultrafine protrusions are formed in the cleaned tread molding surface 3 that do not arise from any other cleaning method. The height of the ultrafine protrusions is at the nm level (about 1 nm or more and several hundred nm or less).

On the other hand, the inventors of the present application confirmed that when the tread molding surface 3 is cleaned by being irradiated with the laser beam L, with the surface roughness Ra in the tread molding surface 3 being 0.12 μm or less, the generation of ultrafine protrusions described above can be suppressed in the cleaned tread molding surface 3. These ultrafine protrusions formed on the tread molding surface 3 that is cleaned by being irradiated with the laser beam L are presumed to contribute to the vulcanized rubber remaining adhered to the cleaned tread molding surface 3 when the vulcanized rubber is released from the mold in the vulcanization step.

Thus, a surface roughness Ra of 0.12 μm or less at least in the main groove molding portion 4a can suppress the generation of ultrafine protrusions in the main groove molding portion 4a even when irradiated with the laser beam L. As a result, even when the green tire TG is vulcanized using the mold 1 after the tread molding surface 3 is cleaned by being irradiated with the laser beam L, the problem of rubber chip formation in the tire T due to vulcanized rubber remaining adhered to the tread molding surface 3 can be avoided.

In other words, not only when the mold 1 is new, but also after the mold 1 is repeatedly used and cleaned with the laser beam L, the problem of rubber chip formation in the tire T due to vulcanized rubber remaining adhered to the tread molding surface 3 can be avoided. Thus, the tire T can be manufactured while preventing rubber chip formation in the tire T over a long period of time.

Furthermore, the inventors of the present application also confirmed that when the tread molding surface 3 is cleaned by being irradiated with the laser beam L under an atmosphere of the inert gas G, the generation of ultrafine protrusions described above can be suppressed in the cleaned tread molding surface 3. The formation of ultrafine protrusions on the tread molding surface 3 that is cleaned with the laser beam L is considered to be suppressed by the irradiation with the laser beam L being performed under an atmosphere in which air (a normal atmospheric component) is eliminated. Thus, when the tread molding surface 3 is cleaned by being irradiated with the laser beam L, the irradiation range is preferably always set under the atmosphere of the inert gas G.

In the cleaning device 7, the irradiation with the laser beam L is performed while supplying the inert gas G toward the irradiation range, or the peripheral range thereof, of the laser beam L. This makes it advantageous to suppress the amount of inert gas G used while maintaining a high concentration of the inert gas Gin the irradiation range.

Figure 11:
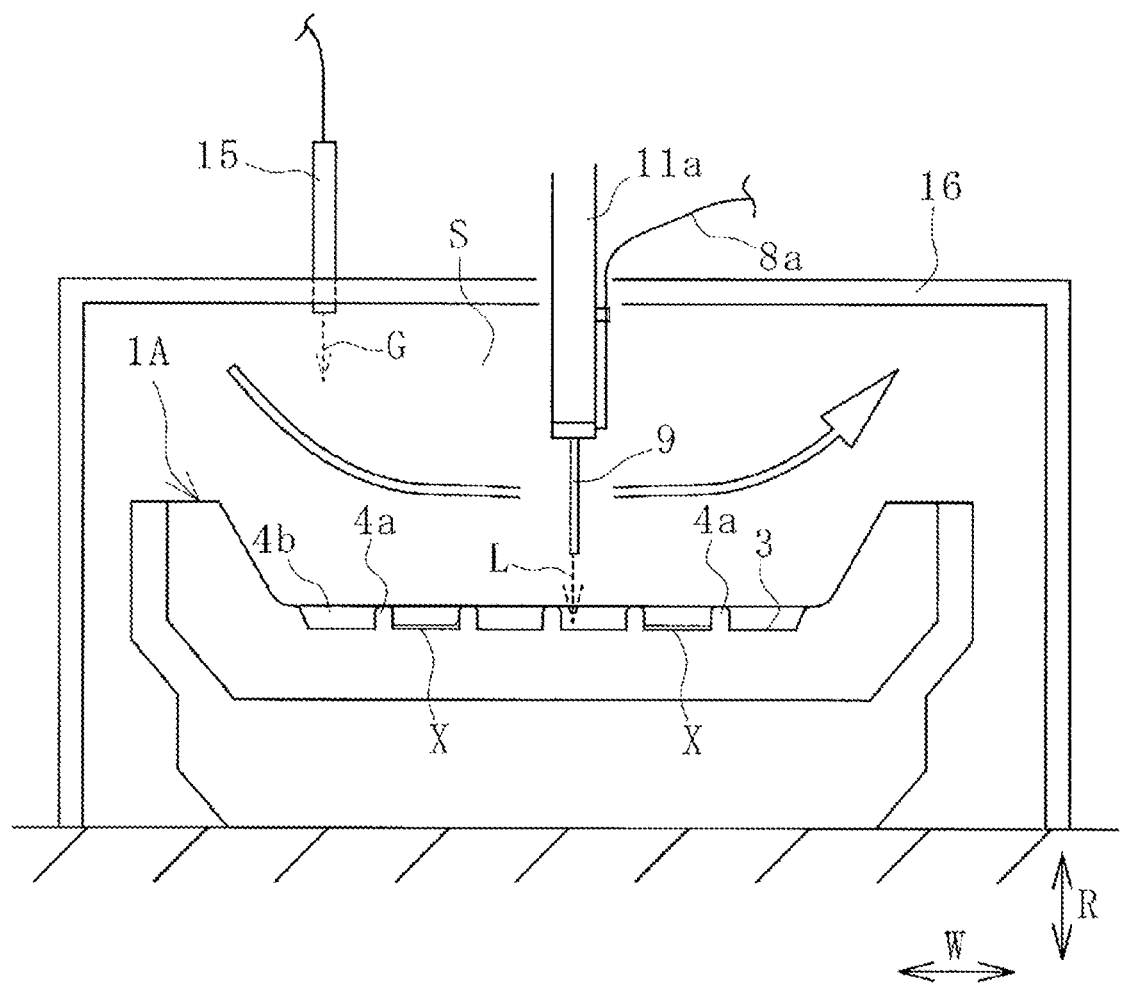
FIG. 11 is an explanatory diagram illustrating, in a front view, a state in which a space surrounded by an irradiation range, a peripheral range thereof, and a cover is being cleaned with an inert gas being filled into the space.
Figure 12:
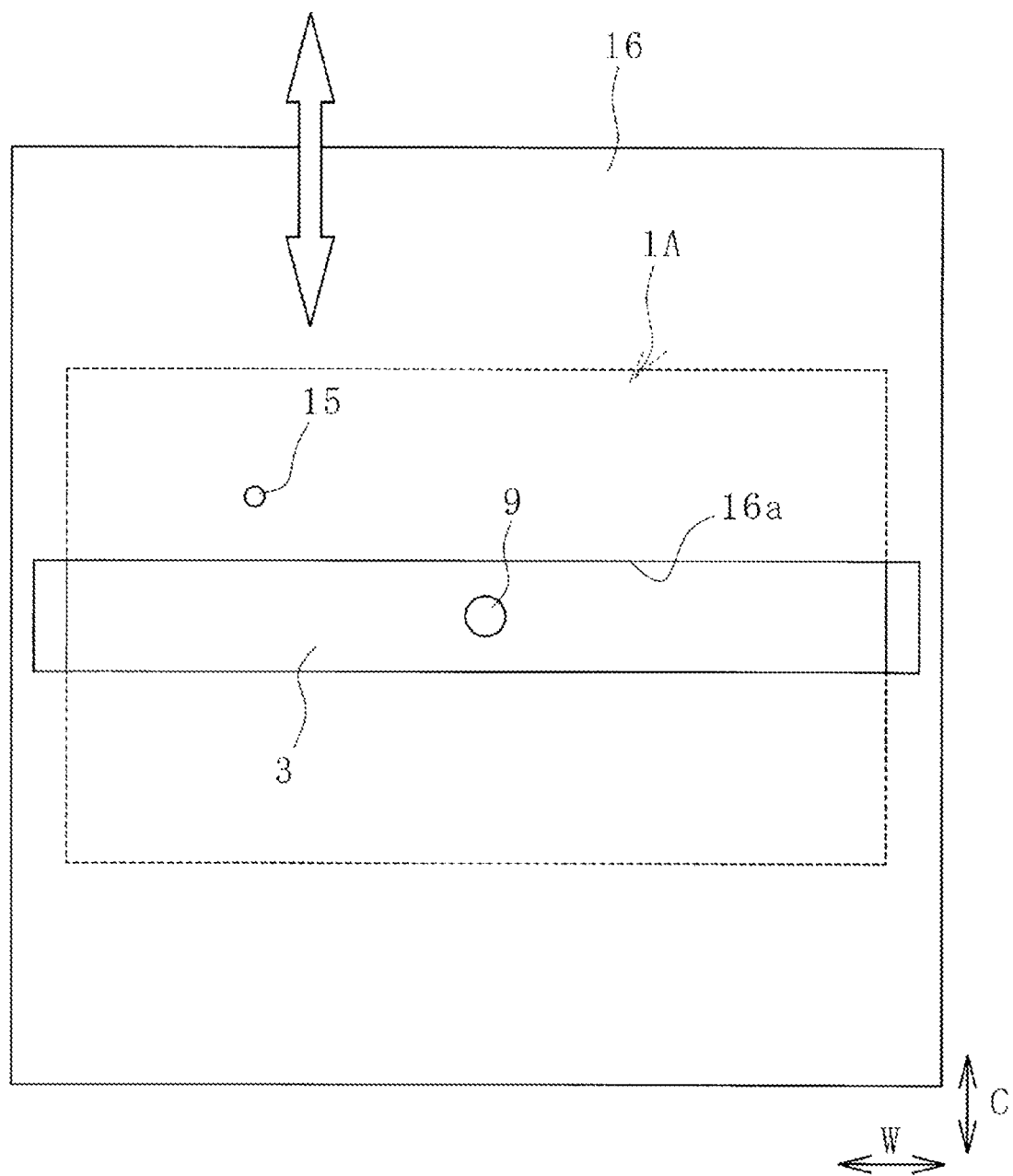
FIG. 12 is an explanatory diagram illustrating the cover and the sector mold of FIG. 11 in a plan view.

Because the inert gas G tends to accumulate downward in the atmosphere, as illustrated in FIGS. 11 and 12, the space S covering the irradiation range and the peripheral range thereof can be filled with the inert gas G and irradiated with the laser beam L. In this embodiment, the cover 16 surrounding the space S is provided in the irradiation range and the peripheral range thereof to fill the space S with the inert gas G supplied into the space S.

The cover 16 includes an opening portion 16a that extends in the tire width direction on the upper surface thereof. The laser head 9 irradiates and cleans the molding surface 2 with the laser beam L while moving along the extending direction of the opening portion 16a. Because the cover 16 is movable with respect to the mold 1, the molding surface 2 can be cleaned entirely by moving the cover 16 in accordance with the movement of the laser head 9 in the tire circumferential direction.

By providing such a cover 16, diffusion of the inert gas G is prevented, and the concentration of the inert gas Gin the space S is easily maintained at a high level. However, because the inert gas G does not diffuse abruptly in the atmosphere, the cover 16 may be omitted, and the space S can be filled with the inert gas G by simply supplying the inert gas G into the space S.

The concentration of the inert gas Gin the irradiation range of the laser beam L is set to an appropriate range, and the supplied amount of the inert gas G from the gas supply unit 13 is controlled to be within the set appropriate concentration range. For the appropriate concentration range of the inert gas G, for example, the tread molding surface 3 is cleaned with the laser beam L at a predetermined irradiation condition in an atmosphere in which the concentration of the inert gas G is varied to a plurality of levels. The degree to which the vulcanized rubber remains adhered during release from the mold is determined for the tread molding surface 3 that is cleaned in an atmosphere at a respective concentration level. Then, the concentration of the inert gas G with which the vulcanized rubber did not remain adhered to the tread molding surface 3 may be set to the appropriate concentration range of the inert gas Gin the predetermined irradiation conditions of the laser beam L.

Note that the main purpose of supplying the inert gas G is to not form the ultrafine protrusions described above on the molding surface 2 where the contaminant X is removed by irradiating with the laser beam L. Thus, the removed contaminant X is not necessary to be blown off by the jet of inert gas G supplied from the supply nozzle 15. Accordingly, it is sufficient that the inert gas G be supplied so that the contaminant X removed by the irradiation with the laser beam L is not blown off by the jet of the inert gas G, and that the irradiation range with the laser beam L be set to be under the atmosphere of the inert gas G.

Figure 13:
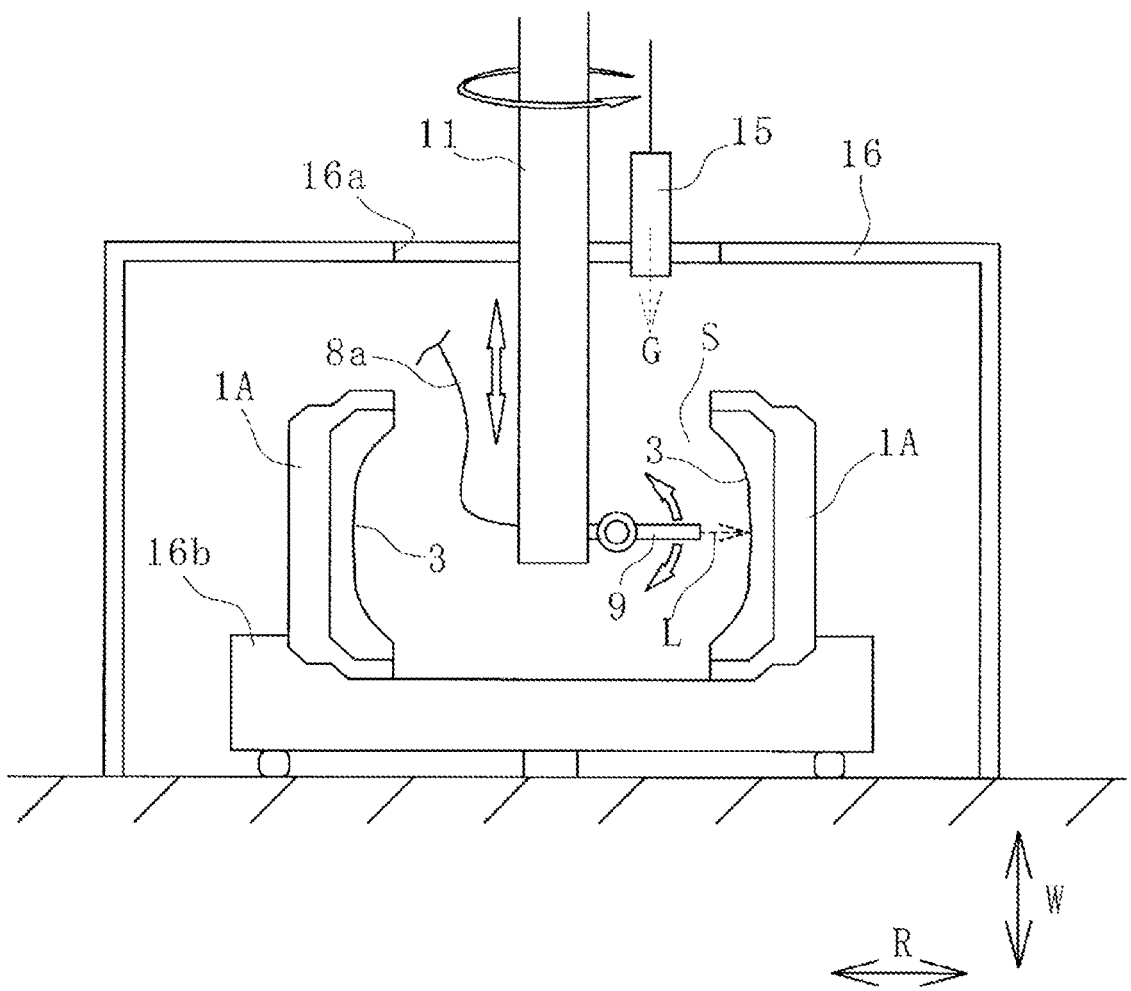
FIG. 13 is an explanatory diagram illustrating, in a cross-sectional view, a state in which a sector mold is being cleaned by another cleaning device.
Figure 14:
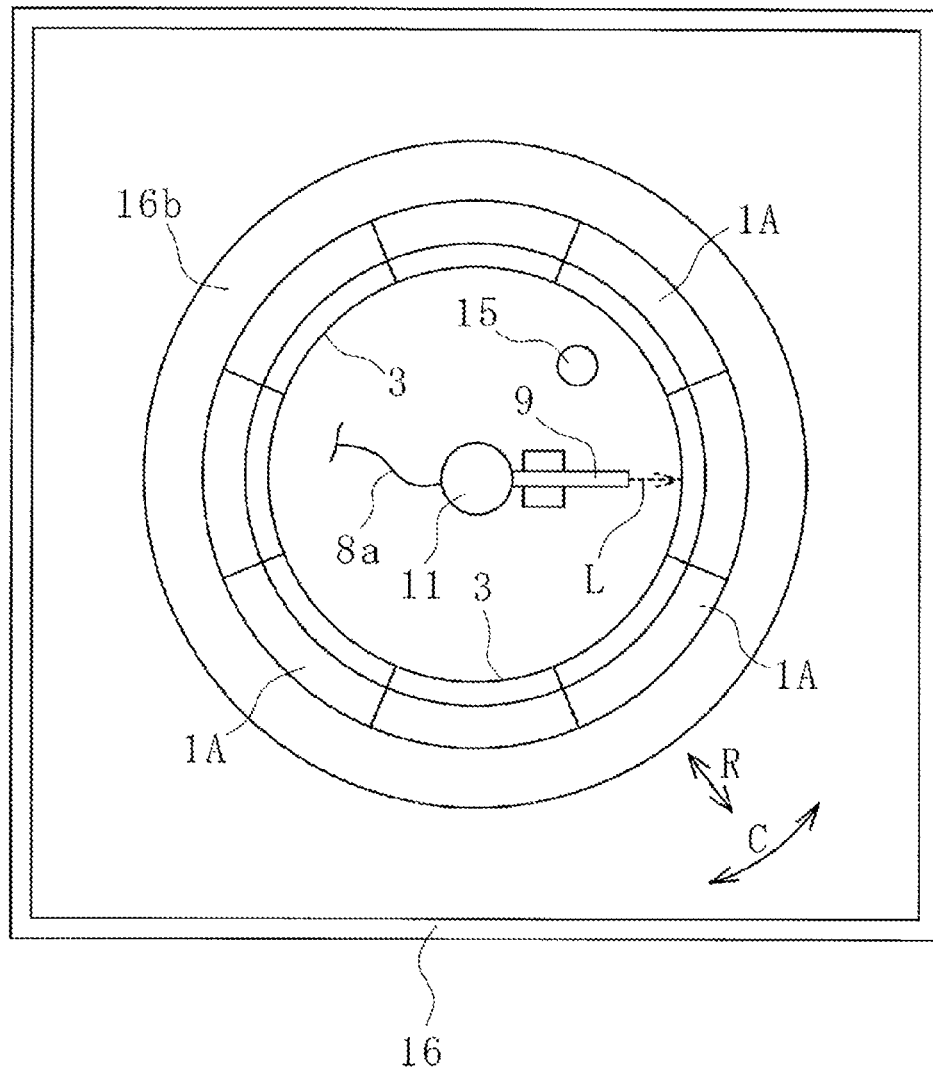
FIG. 14 is an explanatory diagram illustrating an inner portion of the cover of FIG. 13 in a plan view.

In the cleaning device 7 illustrated in FIGS. 13 and 14, a plurality of sector molds 1A are cleaned at a time. Specifically, the sector molds 1A required to vulcanize the single green tire TG are disposed as many as necessary in an annular shape with the tread molding surface 3 disposed on an inner side. Each sector mold 1A is placed on a pedestal 16b. Each sector mold 1A is covered with a cover 16 having an opening portion 16a on a top surface thereof.

The arm 11 that is movable vertically passes through the opening portion 16a, and extends vertically at an annular center portion of the mold 1 arranged in an annular shape. A laser head 9 is attached to the end portion of the arm 11. The supply nozzle 15 is attached to the top surface of the cover 16. The arm 11 is rotatable about a vertical axial center thereof, and the laser head 9 rotates with the arm 11. The laser head 9 can swing vertically.

When cleaning the tread molding surface 3 of each mold 1, the arm 11 is rotated while irradiating with the laser beam L from the laser head 9. Furthermore, the vertical movements of the arm 11 and the vertical swing of the laser head 9 are performed as appropriate, and the laser head 9 is moved across the required range of the tread molding surface 3 to perform cleaning with the laser beam L.

If necessary, the inert gas G is supplied from the supply nozzle 15 to the inner portion of the cover 16, and the space S that covers the irradiation range and the peripheral range of the tread molding surface 3 irradiated with the laser beam L is filled with the inert gas G. In this way, the cleaning is performed by setting the irradiation range of the laser beam L to be under the atmosphere of the inert gas G.

The cleaning device 7 has the advantage of being able to clean multiple molds 1 at a time. Rather than rotating the arm 11 about its vertical axial center, the pedestal 16b can be configured to rotate about the vertical axial center of the arms 11. In addition, in the cleaning device 7, each mold 1 arranged in an annular shape prevents diffusion of the inert gas G supplied to the space S. In other words, because each mold 1 also functions as a cover 16, even if the cover 16 is omitted, the state in which the space S is filled with the inert gas G can be maintained for a relatively long period of time.

As described above, when the molding surface 2 is cleaned by being irradiated with the laser beam L, the generation of nano level ultrafine protrusions on the molding surface 2 can be suppressed by the irradiation range always being under the atmosphere of the inert gas G. By not only using the inert gas G in this manner, but also, whenever irradiating with the laser beam L, setting oxygen content per unit volume in the target region including the irradiation range to a preset reference value (approximately 0.3 kg/m$^3$) or less to put this target region in a low oxygen state, the generation of nano level ultrafine protrusions can be similarly suppressed. For example, when the oxygen concentration in the target region is maintained at 5% or less under atmospheric pressure, a low oxygen state at or below this reference value can be achieved. In other words, in the cleaning method using the inert gas G described above, by setting the irradiation range to be under the atmosphere of the inert gas G, the oxygen content per unit volume in the target region including the irradiation range is less than or equal to the preset reference value.

EXAMPLES

As shown in Table 1, four different states of the molding surface of the mold was prepared (cases 1 to 4), and an unvulcanized rubber used in the tread of a typical tire for a passenger vehicle is vulcanized, and the peel strength (adhesion) required to peel the vulcanized rubber from the molding surface of the mold was measured. The results are shown in Table 1. The peel strength is expressed as an index value, and the higher the index value, the greater the peel strength. The laser irradiation (Yb-YAG laser beam) was performed in the atmosphere and set to the general irradiation conditions used in the cleaning of the tire vulcanization mold.

TABLE 1

|  | Case | | | |
| --- | --- | --- | --- | --- |
|  | 1 | 2 | 3 | 4 |
| Surface roughness Ra (μm) | 3.2 | 3.2 | 0.12 | 0.12 |
| Laser irradiation | No | Yes | No | Yes |
| Peel strength (index value) | 59 | 63 | 14 | 13 |

From the results of Table 1, it can be seen that the smaller the surface roughness Ra in the molding surface of the mold, the lower the peel strength. Furthermore, it can be seen that when the surface roughness Ra is 0.12 μm, the peel strength does not increase even when laser irradiation is performed on the molding surface of the mold.

The invention claimed is:

1. A tire vulcanization mold, comprising:
   a tread molding surface comprising a groove molding portion and a land portion molding portion,
   a surface roughness Ra in the groove molding portion being smaller than a surface roughness Ra in the land portion molding portion, the groove molding portion comprising a surface treated by a surface treatment configured to decrease the surface roughness Ra of the groove molding portion relative to the surface roughness Ra in the land portion molding portion,
   in the groove molding portion, the surface roughness Ra being smallest at 0.12 μm or less in a range comprising at least a main groove molding portion, and
   the surface roughness Ra in the land portion molding portion being 3.2 μm or more, and 4.8 μm or less.

2. The tire vulcanization mold according to claim 1, wherein, in the groove molding portion, a surface roughness Ra is 0.12 μm or less in all ranges except a sipe molding portion.

3. The tire vulcanization mold according to claim 1, wherein a surface roughness Ra in the groove molding portion is 0.12 μm or less in all ranges.

4. A method of manufacturing a tire, comprising:
   vulcanizing a green tire by using the tire vulcanization mold according to claim 1.

5. The method of manufacturing a tire according to claim 4, wherein, when cleaning the tread molding surface, the tread molding surface is irradiated with a laser beam to remove a contaminant adhering to the tread molding surface.

6. The method of manufacturing a tire according to claim 5, wherein, whenever irradiating with the laser beam, oxygen content per unit volume in a target region of the tread molding surface comprising an irradiation range to be irradiated with the laser beam is set to a preset reference value or less to put the target region in a low oxygen state.

7. The method of manufacturing a tire according to claim 6, wherein the oxygen content per unit volume in the target region is set to the reference value or less by supplying an inert gas toward the target region.

8. The method of manufacturing a tire according to claim 5, wherein the contaminant is a rubber component or a rubber compounding agent.

9. A method of manufacturing a tire, comprising:
   vulcanizing a green tire by using the tire vulcanization mold according to claim 3.

10. The method of manufacturing a tire according to claim 9, wherein, when cleaning the tread molding surface, the tread molding surface is irradiated with a laser beam to remove a contaminant adhering to the tread molding surface.

11. The method of manufacturing a tire according to claim 10, wherein, whenever irradiating with the laser beam, oxygen content per unit volume in a target region of the tread molding surface comprising an irradiation range to be irradiated with the laser beam is set to a preset reference value or less to put the target region in a low oxygen state.

12. The method of manufacturing a tire according to claim 11, wherein the oxygen content per unit volume in the target region is set to the reference value or less by supplying an inert gas toward the target region.

13. A method of manufacturing a tire, comprising:
   vulcanizing a green tire by using a tire vulcanization mold, comprising:
      a tread molding surface comprising a groove molding portion and a land portion molding portion,
      a surface roughness Ra in the groove molding portion being smaller than a surface roughness Ra in the land portion molding portion, the groove molding portion comprising a surface treated by a surface treatment configured to decrease the surface roughness Ra of the groove molding portion relative to the surface roughness Ra in the land portion molding portion,
      in the groove molding portion, the surface roughness Ra being smallest at 0.12 μm or less in a range comprising at least a main groove molding portion, and the surface roughness Ra in the land portion molding portion being 3.2 µm or more; wherein
when cleaning the tread molding surface, the tread molding surface is irradiated with a laser beam to remove a contaminant adhering to the tread molding surface, the laser beam is a Yb-YAG (Ytterbium-doped Yttrium Aluminum Garnet) laser beam having a wavelength of 1030 nm or an Nd-YAG (Neodymium-doped Yttrium Aluminum Garnet) laser beam having a wavelength of 1064 nm,
a light source output of the laser beam is 1 W or more and 5 kW or less,
a pulse width of the laser beam is 1 ns or more and 500 ns or less,
a pulse energy of the laser beam is 1 mJ or more and 0.1 J or less,
a pulse frequency of the laser beam is 1 kHz or more and 100 kHz or less,
a fluence of the laser beam is 0.5 $J/m^2$ and 4.0 $J/m^2$ or less, and
a beam diameter of the laser beam is 0.1 mm or more and 3 mm or less.

\* \* \* \* \*